UNITED STATES PATENT OFFICE.

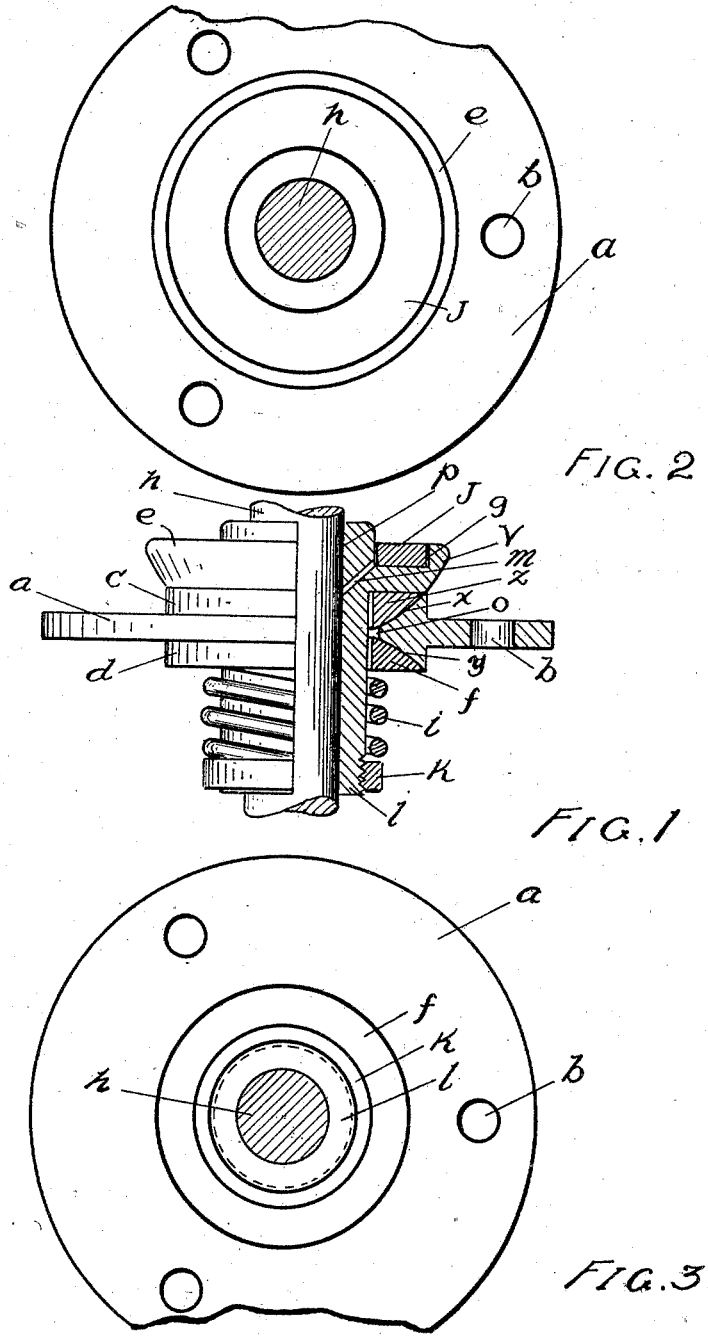

LEWIS A. BERNARD, OF WATERLOO, IOWA, ASSIGNOR TO PEERLESS CREAM SEPARATOR COMPANY, OF WATERLOO, IOWA.

RESILIENT COLLAR-BEARING FOR CENTRIFUGAL MACHINES.

967,312.   Specification of Letters Patent.   Patented Aug. 16, 1910.

Application filed April 28, 1910. Serial No. 558,101.

*To all whom it may concern:*

Be it known that I, LEWIS A. BERNARD, a citizen of the United States of America, and a resident of Waterloo, Blackhawk county, Iowa, have invented certain new and useful Improvements in Resilient Collar-Bearings for Centrifugal Machines, of which the following is a specification.

This invention relates to that form of collar-bearings which are used about spindles of centrifugal cream separator bowls to keep such spindles and bowls in the same axial alinement, and prevent oscillations thereof.

The object of my invention is to prevent the riding up of the spindle-bushing upon its bearing, and to adapt said bushing and the bearing parts relatively to each other so as to cause them to act concurrently and resiliently together to keep the inclosed spindle centered, or return it to center when oscillations occur in its rotatory movement. This object I have accomplished by the means which are hereinafter described and claimed, and which are illustrated in the accompanying drawings, in which:

Figure 1 is a side elevation, the right-hand half in vertical central axial section, of my improved resilient collar-bearing as operatively supporting a spindle, the ends of said spindle being broken away outside of the bushing. Fig. 2 is an upper plan view of said bearing, and Fig. 3 is an under plan view of said bearing.

The annular flat plate $a$ is supplied with a plurality of bolt-holes $b$ whereby it may be secured removably to the frame body of a centrifugal cream separator. Surrounding the central opening $o$ of said plate concentrically and extending upward and downward respectively from their upper and under surfaces are annuli $c$ and $d$, such flanged annuli having dished or concave upper or outwardly-directed surfaces, the contour of which respectively is in each case spherical, with the same length of radius. A bushing $e$ is received concentrically within the central hollow $o$ of said plate $a$, its lower portion $l$ being cylindrical, while its upper portion has an expansion $v$ the lower surface of which affords a seat for an annular body $z$ loosely seated about the cylindrical part $l$ of said bushing. Said annular body $z$ is adapted to fit within the curved hollow $x$ of said annulus $c$, having a like curved contacting surface. An annular trough $g$ is formed in the upper part of said expansion $v$ to hold a felt washer $j$ saturated with a suitable lubricant, a passage $m$ serving to convey the lubricant through the bushing to its axial hollow $p$. Within the axial hollow $p$ of said bushing is received a spindle $h$ of a centrifugal cream separator bowl (not shown). The cylindrical part $l$ of said bushing extends downward through the axial hollow $o$ of said plate $a$ and for a suitable distance below it, and has an exterior thread on its lower end adapted to receive an interiorly-threaded nut $k$. An annular body $f$ is loosely seated about the cylindrical extension $l$ of said bushing concentrically. The upper surface of said body $f$ has the same spherical contour as the bearing-surface of the annulus $d$ and fits therein. A coiled compression-spring $i$ is seated about the cylindrical extension $l$ of said bushing and bears against the under flat surface of the annular body $f$ to keep same in contact with its bearing $y$. The nut $k$ bears against the spring adjustably, whereby the tension of the spring may be varied as desired.

Operatively, it will be noticed that the provision of the two oppositely-located spherically-curved bodies $z$ and $f$ in their bearings of the same radii at $x$ and $y$ will cause the spindle $h$ to become self-centering, by reason of their like movements, and that the bodies $e$ and $z$ cannot be drawn or pushed upward over or out of contact with the bearing annulus $c$, since the said movements are, by means of the spring $i$, caused to be of a rocking character alone. The spring $i$ bears only against the body $f$ and the nut $k$, thus acting solely on the moving parts. The bodies $z$ and $f$ are loosely seated giving ease in action, and equality in centering the shaft.

Having described my invention, what I claim as new, and desire to secure by Letters Patent, is:

1. In combination, a rotatable spindle, a cylindrical bushing therefor having an outwardly enlarged upper end and having its lower end exteriorly threaded, a fixed base-plate having an opening adapted to loosely receive said bushing, said base-plate having outwardly-directed annular projections on opposite sides and both concentric with said spindle, the outer bearing surfaces of said annular projections being spherically concaved, an annulus seated about said bushing in contact with the upper expansion thereof and provided with a convex under bearing-surface adapted to fit the concaved upper surface of the annular projection on the upper side of said base-plate, a second annulus seated about said bushing below said base-plate having a spherical convex upper surface adapted to fit the concave under surface of the annular projection on the under side of said base-plate, an adjusting-nut movable on the exterior threads of said bushing, and a compression-spring seated between said nut and said second mentioned annulus and engaging both operatively.

2. In combination, a rotatable spindle, a bushing therefor having a widened upper end, a fixed base-plate having an opening adapted to receive said bushing, said base-plate having annular projections on opposite sides concentric with said opening, each of said annular projections having its outwardly-directed face dished, an annulus seated about said bushing above said base-plate and contacting the expansion of the bushing and having its lower face adapted to fit the dished surface of said annular projection, a second annulus seated about said bushing below said base-plate and having its upper surface adapted to fit the lower dished surface of the other annular projection, and means for retaining said annuli in movable bearing contact with the said annular projections respectively.

3. In combination, a rotatable spindle, a bushing therefor, a fixed base-plate having an opening for said bushing, said base-plate having a dished seat on each side concentric with said bushing, an annulus movably seated in the upper dished seat and having its upper part movably engaged with said bushing, a second annulus having its upper face adapted to fit the other seat, and means for resiliently holding said parts together in movable contact.

4. In combination, a rotatable spindle, a fixed base-plate having an opening for said spindle, said base-plate having a dished seat on each side concentric with said spindle, an annulus seated in each of said dished seats concentric with said spindle and having its bearing surface fitted to its seat, and means for resiliently holding said parts together about said spindle in moving contact with each other.

Signed at Waterloo, Iowa, this 9th day of April, 1910.

LEWIS A. BERNARD.

Witnesses:
 ETHEL E. BARR,
 G. C. KENNEDY.